Sept. 18, 1923.
G. B. HAMRIC
1,468,265
TROLLEY POLE
Filed Feb. 7, 1923
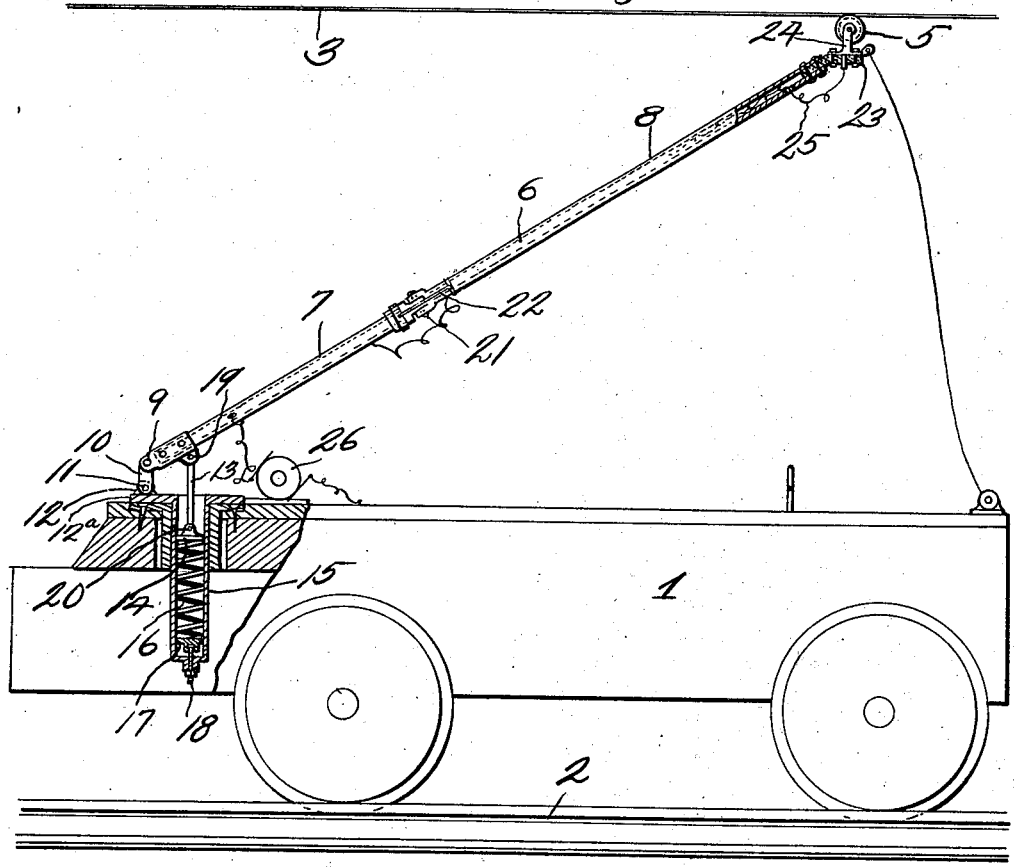
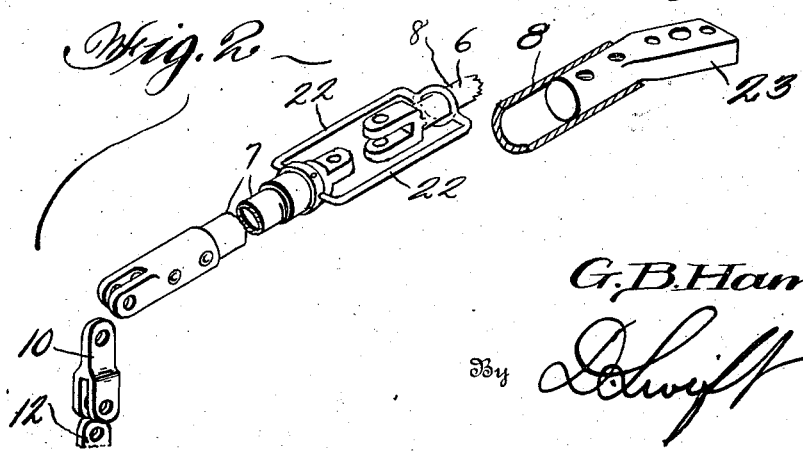
Inventor
G. B. Hamric
By
Attorney Patented Sept. 18, 1923.

1,468,265

UNITED STATES PATENT OFFICE.

GROVER B. HAMRIC, OF WIDEN, WEST VIRGINIA.

TROLLEY POLE.

Application filed February 7, 1923. Serial No. 617,660.

*To all whom it may concern:*

Be it known that I, GROVER B. HAMRIC, a citizen of the United States, residing at Widen, in the county of Clay, State of West Virginia, have invented a new and useful Trolley Pole; and I do hereby declare the following to be a full, clear, and exact description of the invention, such as will enable others skilled in the art to which it appertains to make and use the same.

The invention relates to trolley poles, particularly adapted for use in connection with mine cars, and has for its object to provide a device of this character wherein the lower end of the trolley pole is connected with the mine car so as to be pivotally movable in a vertical longitudinal plane, in addition to rotative movement in a horizontal plane, said trolley pole being forced upwardly by means of a coiled spring cooperating with a piston which has a link connection with the pole. Also to form the trolley pole from hingedly connected metallic sections, which sections are normally in axial alignment with each other, and the upper section if the trolley wheel comes off the wire will fold transversely onto the lower section thereby preventing breakage of the trolley pole.

A further object is to provide an arm carried by the upper end of the upper section of the trolley pole, said arm being formed from insulating material and having pivotally mounted therein a trolley wheel supporting bracket.

A further object is to provide means whereby the tension of the coiled spring may be varied for regulating the pressure of the conductor wheel on the conductor wire.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a conventional form of mine car, showing the trolley applied thereto, and parts in section to better illustrate the structure.

Figure 2 is a detail collective view in perspective of the parts forming the lower portion of the trolley pole.

Figure 3 is a detail perspective view of the trolley wheel supporting arm, and a portion of the upper trolley pole section.

Referring to the drawing, the numeral 1 designates a conventional form of motor car, of the type used in mines, and 2 the track on which the motor car runs. Disposed above the track 2 is a conventional form of trolley wire 3, with which trolley wire the conductor wheel 5 contacts in the usual manner. The conductor wheel is carried by a trolley pole 6, which trolley pole is formed from metallic tubing and in sections, said sections being designated by the numerals 7 and 8. The lower end of the trolley pole 6 is pivotally connected at 9 to a vertically disposed link 10, which link is in turn pivotally connected at 11 to an ear 12 carried by the flange 12$^a$. It will be seen that the link 10 allows forward and rearward movement of the trolley pole 6 in a vertical longitudinal plane as the trolley pole is forced upwardly by the connecting rod 13 which is carried by the piston 14 slidably mounted in a rotatable cylinder 15. The flange 12$^a$ is formed integral with the cylinder 15 and consequently rotates therewith thereby allowing the pole as a whole to be turned entirely around. The piston 14 is forced upwardly by the coiled spring 16, which coiled spring is interposed between the piston 14 and the vertically movable and adjustable disc 17 in the lower end of the rotatable cylinder 15, therefore the spring maintains the trolley pole 6 in position where the conductor wheel 5 will be maintained in engagement with the trolley wire 3. The disc 17 is adjusted upwardly and downwardly for varying the tension of the spring 16 by means of the adjusting screw 18. Connecting rod 13 is pivotally connected at 19 to the trolley pole and at 20 to the piston 14, and consequently forward and rearward movement in a longitudinal vertical plane of the trolley 6 for a limited distance may take place without binding the piston 14.

The trolley pole sections 7 and 8 are hingedly connected together at 21, in such a manner that the section 8 may move transversely in another direction independent of the section 7 and is returned to aligned position by the spring arms 22 carried by the section 7 and engaging opposite sides of the section 8. By providing the pivotal point 21, it will be seen that if the trolley wheel 5 comes into engagement with anything, for instance when the wheel comes off the wire, the section 8 will move independent of the section 7, thereby preventing breakage of the pole, or injury to the operator of the motor, which is now common where poles are made in one piece and of wood.

Secured to the upper end of the pole section 8 is an arm 23, formed from insulating material, which arm has secured thereto a bracket 24 in which the trolley wheel 5 is rotatably mounted. The wire 25 which is connected to the bracket 24 passes through the tubular sections 8 and 7 to a motor 26 in the usual manner.

From the above it will be seen that a sectional metallic trolley pole is provided, the sections of which are hingedly connected. It will also be seen that the lower end of the trolley pole is connected to the car in such a manner that it will have movement in a vertical longitudinal plane and in a horizontal plane, thereby allowing the use of a piston within a cylinder for normally forcing the pole upwardly and maintaining the wheel 5 in engagement with the trolley wire 3.

The invention having been set forth what is claimed as new and useful is:—

The combination with a trolley pole, of a mounting for the lower end of said trolley pole, said mounting comprising a vertically disposed link, the upper end of said link being pivotally connected to the lower end of the trolley pole, the lower end of said link being pivotally connected to a support, said support comprising a rotatable cylinder disposed beneath the trolley pole, a piston vertically movable in the cylinder, a connecting rod pivoted to the piston and to the pole, a coiled spring disposed within the cylinder and normally forcing the piston upwardly and adjusting means whereby the tension of the coiled spring may be varied.

In testimony whereof I have signed my name to this specification in the presence of two subscribing witnesses.

GROVER B. HAMRIC.

Witnesses:
A. J. WILSON,
STERLING HAMRIC.